United States Patent
Nakayama (10) Patent No.: US 10,245,955 B2
(45) Date of Patent: Apr. 2, 2019

(54) VEHICLE CAPABLE OF SUPPRESSING AN IMPACT TO BATTERY UNITS AT A TIME OF COLLISION

(71) Applicant: HONDA MOTOR CO., LTD., Tokyo (JP)

(72) Inventor: Shinya Nakayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/791,749

(22) Filed: Oct. 24, 2017

(65) Prior Publication Data

US 2018/0111483 A1   Apr. 26, 2018

(30) Foreign Application Priority Data

Oct. 25, 2016 (JP) .................................. 2016-209016

(51) Int. Cl.
| | |
|---|---|
| *B60K 1/04* | (2019.01) |
| *B60L 3/00* | (2019.01) |
| *B60L 11/18* | (2006.01) |
| *B62D 21/15* | (2006.01) |

(52) U.S. Cl.
CPC .............. *B60L 3/0007* (2013.01); *B60K 1/04* (2013.01); *B60L 11/1877* (2013.01); *B60L 11/1879* (2013.01); *B62D 21/155* (2013.01); *B60K 2001/0416* (2013.01); *B60K 2001/0422* (2013.01); *B60K 2001/0433* (2013.01); *B60K 2001/0438* (2013.01); *B60L 2210/10* (2013.01); *B60Y 2200/91* (2013.01); *B60Y 2306/01* (2013.01); *Y02T 10/7005* (2013.01); *Y02T 10/705* (2013.01); *Y02T 10/7216* (2013.01)

(58) Field of Classification Search
CPC ....................................................... B60K 1/04
See application file for complete search history.

(56) References Cited

U.S. PATENT DOCUMENTS

2008/0062622 A1   3/2008   Fukazu et al.
2011/0300426 A1   12/2011  Iwasa et al.
(Continued)

FOREIGN PATENT DOCUMENTS

| JP | 2008-062781 A | 3/2008 |
|---|---|---|
| JP | 2012-054054 A | 3/2012 |

(Continued)

*Primary Examiner* — James A Shriver, II
*Assistant Examiner* — James J Triggs
(74) *Attorney, Agent, or Firm* — Paratus Law Group, PLLC (57) ABSTRACT

A vehicle includes: a first battery unit including a front module group which has a plurality of battery modules and which is arranged under a front seat of the vehicle, a middle module group which has a plurality of battery modules and which is arranged under a rear seat of the vehicle, and a front casing accommodating the front module group and the middle module; and a second battery unit including a rear module group which has a plurality of battery modules and which is arranged in a rear portion of the vehicle, and a rear casing accommodating the rear module group. The front casing and the rear casing are independently fixed to a skeletal structure of the vehicle, and a space is provided between the front casing and the rear casing.

12 Claims, 10 Drawing Sheets

(56) References Cited

U.S. PATENT DOCUMENTS

| | | | |
|---|---|---|---|
| 2013/0020139 A1* | 1/2013 | Kim ....................... | B60K 1/04 180/68.5 |
| 2013/0202936 A1 | 8/2013 | Kosaki et al. | |
| 2015/0010782 A1 | 1/2015 | Tanigaki et al. | |

FOREIGN PATENT DOCUMENTS

| | | |
|---|---|---|
| JP | 2012-096716 A | 5/2012 |
| JP | 5104997 B2 | 12/2012 |
| JP | 2013-171663 A | 9/2013 |
| JP | 2013-252731 A | 12/2013 |
| JP | 2014-031111 A | 2/2014 |
| JP | 2016-132314 A | 7/2016 |
| WO | WO 2016/088475 A1 | 6/2016 |

\* cited by examiner

VEHICLE CAPABLE OF SUPPRESSING AN IMPACT TO BATTERY UNITS AT A TIME OF COLLISION

CROSS-REFERENCE TO RELATED APPLICATION(S)

This application claims priority from Japanese Patent Application No. 2016-209016 filed on Oct. 25, 2016, the entire contents of which are incorporated herein by reference.

FIELD

The present invention relates to a vehicle such as a hybrid vehicle, and an electric vehicle, which is equipped with a battery.

BACKGROUND

A vehicle is disclosed in Japanese Patent No. 5104997 in which a first battery group, a second battery group, and a third battery group are disposed in the front and rear direction of a vehicle and these first to third battery groups are mounted and unitized on a battery mounting frame.

In the vehicle disclosed in Japanese Patent No. 5104997, however, since the plurality of battery groups are accommodated in one unit, if a battery unit is disposed in a rear portion of the vehicle and a large impact is applied to the battery unit at the time of a rear collision of the vehicle, for example, there is a possibility that the impact is transmitted between the battery groups. On the other hand, when the plurality of battery groups are separately unitized, the number of parts increases, and the manufacturing cost and assembly time increases.

SUMMARY

The invention is to provide a vehicle capable of suppressing an impact to battery units at the time of a collision of the vehicle while suppressing an increase in the number of parts of the battery units.

The invention provides following aspects (1) to (11). The reference numerals in parentheses indicate the corresponding constituent elements of the embodiment(s) described later, but the present invention is not limited thereto.

(1) A vehicle including:
a first battery unit (e.g., a first battery unit 10) including a front module group (e.g., a front module group 31) which has a plurality of battery modules (e.g., battery modules 30a) and which is arranged under a front seat (e.g., a front seat 4) of the vehicle, a middle module group (e.g., a middle module group 32) which has a plurality of battery modules (e.g., battery modules 30a) and which is arranged under a rear seat (e.g., a rear seat 5) of the vehicle, and a front casing (e.g., a casing 50) accommodating the front module group and the middle module; and a second battery unit (e.g., a second battery unit 60) including a rear module group (e.g., a rear module group 33) which has a plurality of battery modules (e.g., battery modules 30a) and which is arranged in a rear portion of the vehicle, and a rear casing (e.g., a casing 55) accommodating the rear module group, wherein the front casing and the rear casing are independently fixed to a skeletal structure (e.g., a skeletal structure 74) of the vehicle, and a space (e.g., a space S) is provided between the front casing and the rear casing.

(2) The vehicle according to (1), wherein
the first battery unit and the second battery unit are arranged under a floor panel (e.g., a floor panel 3), and
the front casing and the rear casing are fixed to the skeletal structure from below the vehicle.

(3) The vehicle according to (1) or (2), wherein
the second battery unit is arranged in a region surrounded by a rear sub frame (e.g., a rear sub frame 80) and is fixed to the skeletal structure via the rear sub frame.

(4) The vehicle according to (3), wherein
a front frame (e.g., a front frame 80F) of the rear sub frame is arranged in the space, and
a cross member (e.g., a cross member 88) connected across the skeletal structure is arranged above the front frame.

(5) The vehicle according to (4), wherein
a high voltage system equipment (e.g., a junction box 23) is arranged together with the front module group and the middle module group in the front casing of the first battery unit, and
a harness (e.g., a harness 36) extending from the rear module group of the second battery to the high voltage system equipment of the first battery unit is arranged under the front frame.

(6) The vehicle according to (5), wherein
the front module group and the middle module group are connected to the high voltage system equipment through a high voltage wiring, and
the high voltage system equipment and the high voltage wiring are arranged at a middle portion of the front casing in a widthwise direction of the vehicle.

(7) The vehicle according to any one of (1) to (6), wherein
a first maintenance checking plug (e.g., a first maintenance checking plug 31p) that interrupts input and output of electricity of the front module group and a second maintenance checking plug (e.g., a second maintenance checking plug 32p) that interrupts input and output of electricity of the middle module group are arranged to be adjacent to each other in the first battery unit,
the first casing is provided with a first opening (e.g., a first cover opening 52a), and
the first maintenance checking plug and the second maintenance checking plug are operable through the first opening.

(8) The vehicle according to (7), wherein
the first battery unit and the second battery unit are arranged under a floor panel (e.g., a floor panel 3), and
the first maintenance checking plug and the second maintenance checking plug are operable through a first panel opening (e.g., a first panel opening 3a) provided in the floor panel.

(9) The vehicle according to (8), wherein
a third maintenance checking plug (e.g., a third maintenance checking plug 33p) that interrupts input and output of electricity of the rear module group is arranged in the second battery unit,
the rear casing is provided with a second opening (e.g., a second opening 57a), and
the third maintenance checking plug is operable through the second opening and through a second panel opening (e.g., a second panel opening 3c) provided in the floor panel.

(10) The vehicle according to any one of (3) to (6), wherein
the rear module group is arranged under a luggage compartment (e.g., a luggage compartment 6).

(11) A vehicle including:

a driving unit (e.g., a vehicle driving motor M) which is arranged in a front portion of a vehicle and which drives wheels of the vehicle;

a front driving power source (e.g., a front module group 31) which arranged under a front seat of the vehicle and which supplies fuel or electric power to the driving unit;

a middle driving power source (e.g., a middle module group 32) which is arranged under a rear seat of the vehicle and which supplies fuel or electric power to the driving unit; and a rear driving power source (e.g., a rear module group 33) which is arranged in a rear portion of the vehicle and which supplies fuel or electric power to the driving unit, wherein the front driving power source and the middle driving power source are accommodated in a front casing (e.g., a casing 50), the rear driving power source is accommodated in a rear casing (e.g., a casing 55), the front casing and the rear casing are independently fixed to a skeletal structure (e.g., a skeletal structure 74) of the vehicle, and a space (e.g., a space S) is provided between the front casing and the rear casing.

According to the configuration (1), since the front casing of the first battery unit and the rear casing of the second battery unit are independently fixed to the skeletal structure of the vehicle and the space is provided between the front casing and the rear casing, it is possible to prevent the impact applied to the second battery unit at the time of a rear collision from being directly transmitted to the first battery unit, thereby alleviating the impact.

In addition, the lower part of the front seat and the rear seat where the first battery unit is disposed is a region which is relatively unlikely to receive an impact. Furthermore, deterioration in impact resistance also can be suppressed even when the front module group and the middle module group are unitized.

Moreover, since the first battery unit and the second battery unit are arranged in the front and rear direction of the vehicle, the weight balance is improved.

According to the configuration (2), since the first battery unit and the second battery unit are disposed below the floor panel and the front casing and the rear casing are fixed from below the vehicle, the first battery unit and the second battery unit can be attached to and detached from the vehicle from below the vehicle, and thus assembly property and maintainability are improved.

According to the configuration (3), since the second battery unit is surrounded by the rear sub frame, the second battery unit can be protected from the impact at the time of a rear collision.

According to the configuration (4), since the front frame of the rear sub frame and the cross member are arranged in the space, the first battery unit can be protected, from the impact at the time of the rear collision, by the front frame of the rear sub frame and the cross member.

According to the configuration (5), since the harness extending from the rear module group of the second battery unit to the high voltage system equipment of the first battery unit is arranged below the front frame, connection work for the harness also can be performed from below the vehicle, and thus assembly property and maintainability are improved.

According to the configuration (6), since the high voltage system equipment and the high voltage wiring are arranged in the middle portion in the widthwise direction of the front casing, the high voltage system equipment and the high voltage wiring can be protected from the impact at the time of a side collision.

According to the configuration (7), since the first maintenance checking plug for interrupting the input and output of electricity of the front module group and the second maintenance checking plug for interrupting the input and output of electricity of the middle module group are arranged close to each other, both of the maintenance checking plugs can be accessed through a single cover opening provided in the front casing.

According to the configuration (8), since the first maintenance checking plug and the second maintenance checking plug are operable through the first panel opening provided in the floor panel, an operation for interrupting the input and output of electricity of the front module group and the middle module group can be performed in the vehicle interior at the time of maintenance.

According to the configuration (9), since the third maintenance checking plug also is operable through the second panel opening provided in the floor panel, an operation for interrupting the input and output of electricity of the rear module group can be performed in the vehicle interior at the time of maintenance.

According to the configuration (10), since the rear module group is located below the luggage compartment, the second battery unit is apt to receive the impact at the time of the rear collision, but the second battery unit can be prevented by the rear sub frame surrounding the second battery unit and the first battery unit can be prevented by the space from the impact applied to the second battery unit.

According to the configuration (11), since the front casing and the rear casing are independently fixed to the skeletal structure of the vehicle and the space is provided between the front casing and the rear casing, it is possible to prevent the impact applied to the rear casing at the time of a rear collision from being directly transmitted to the front casing, thereby alleviating the impact.

In addition, the lower part of the front seat and the rear seat where the front driving power source and the middle driving power source are disposed is a region which is relatively unlikely to receive an impact. Furthermore, deterioration in impact resistance also can be suppressed even when the front driving power source and the middle driving power source are accommodated and unitized in the front casing.

Moreover, since the driving unit, the front driving power source, the middle driving power source, and the rear driving power source are arranged in the front and rear direction of the vehicle, the weight balance is improved.

Furthermore, it is possible to dispose a battery casing, a fuel tank, a hydrogen cylinder, or the like as the rear driving power source and have high versatility.

DETAILED DESCRIPTION

Hereinafter, a vehicle according to an embodiment of the present invention will be described with reference to the accompanying drawings. It should be noted that the drawings provide diagrams of a vehicle that is viewed in the directions of reference numerals.

[Vehicle]

Figure 1:
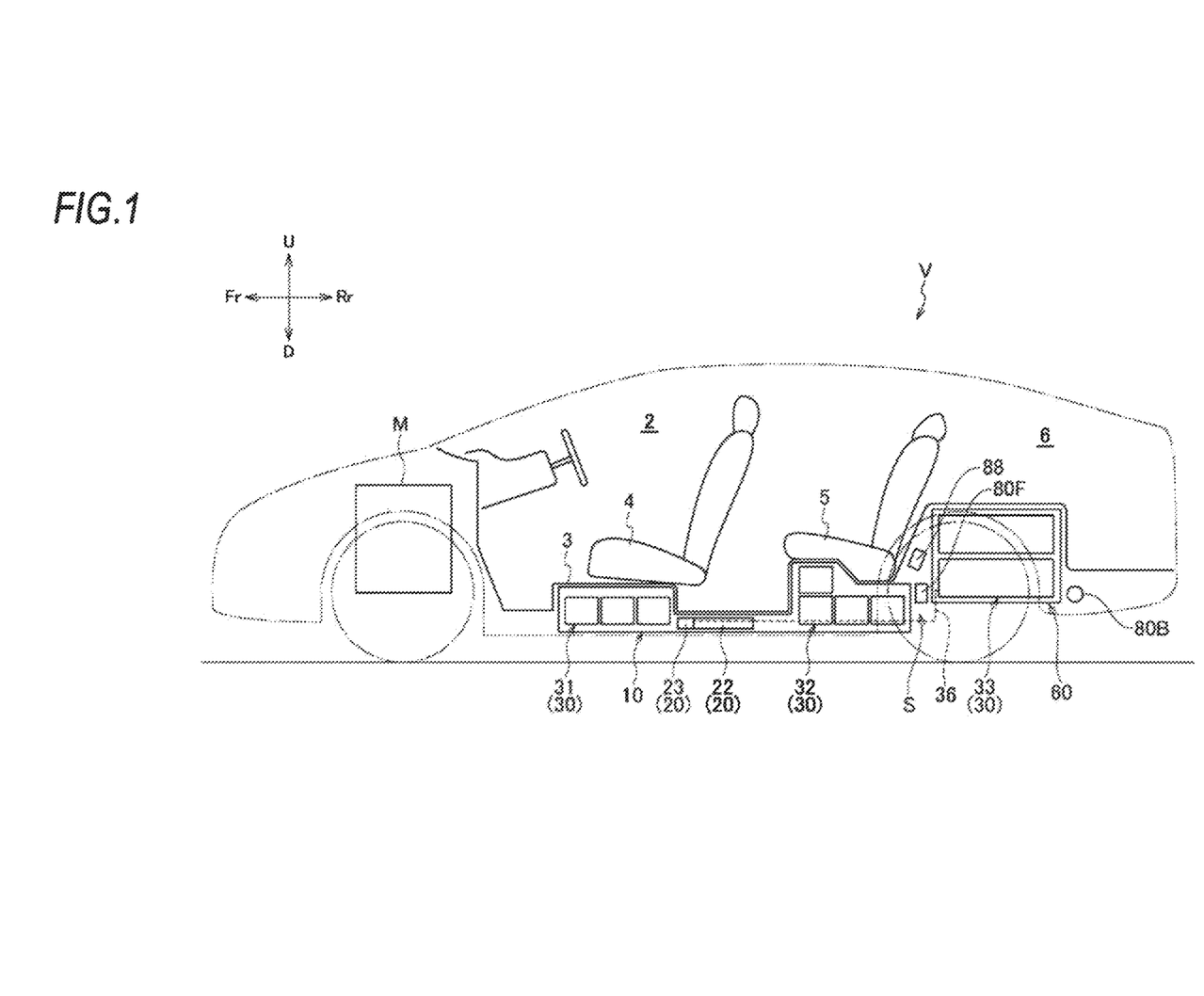
FIG. 1 is a schematic side view of a vehicle of an embodiment of the invention.

As illustrated in FIG. 1, a vehicle V according to the embodiment of the present invention is, for example, a hybrid vehicle, an electric vehicle, or a fuel cell vehicle which is equipped with a vehicle driving motor M in a front portion thereof, and includes a battery 30 connected to the vehicle driving motor M and a high voltage system equipment 20.

[Battery]

The battery 30 includes a front module group 31, a middle module group 32, and a rear module group 33 that are spaced from each other. Each of the module groups 31 to 33 is an aggregation of a plurality of rectangular parallelepiped battery modules 30a each including a plurality of battery cells sequentially stacked.

Figure 2:
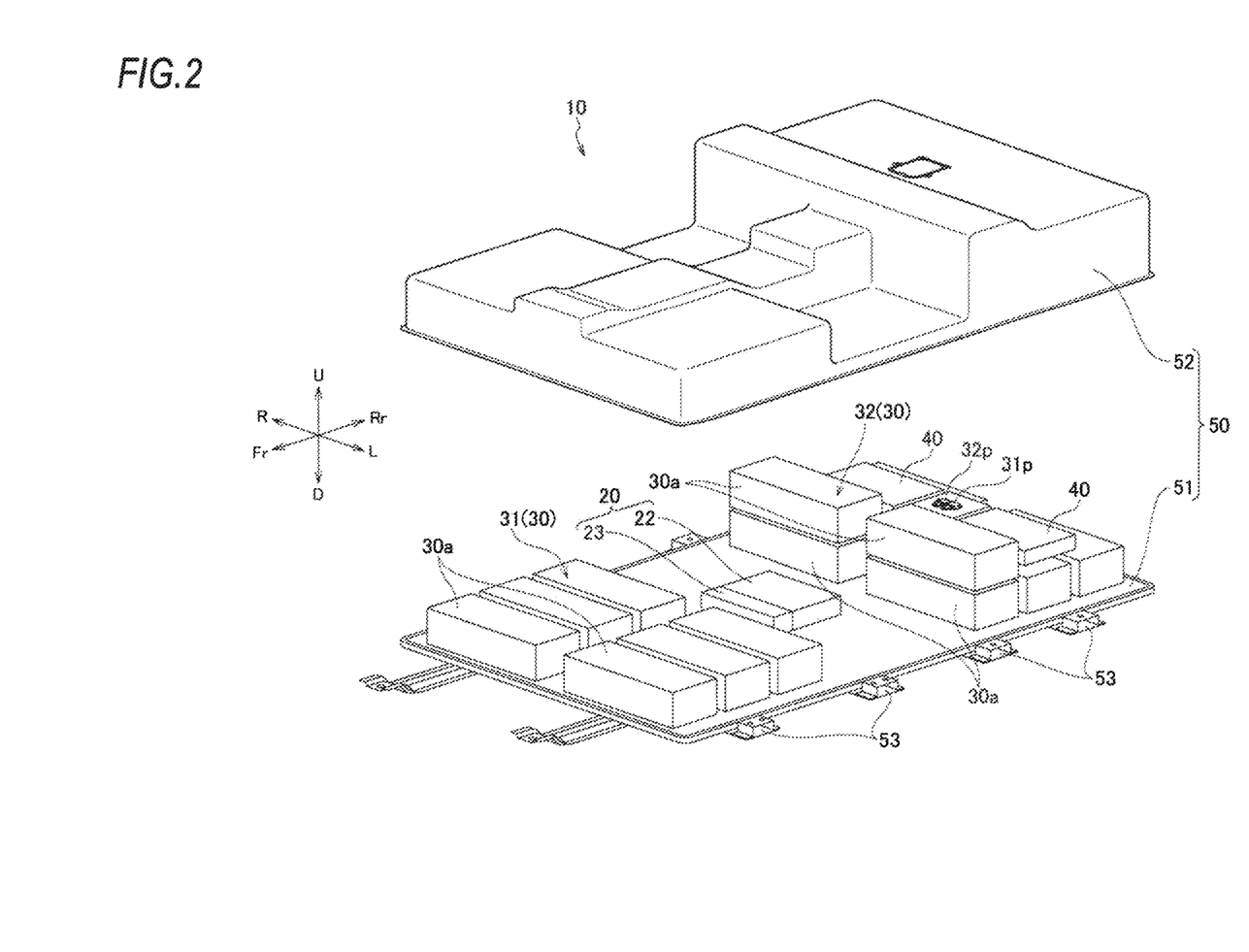
FIG. 2 is an exploded perspective view schematically illustrating a first battery unit mounted on the vehicle in FIG. 1.
Figure 3:
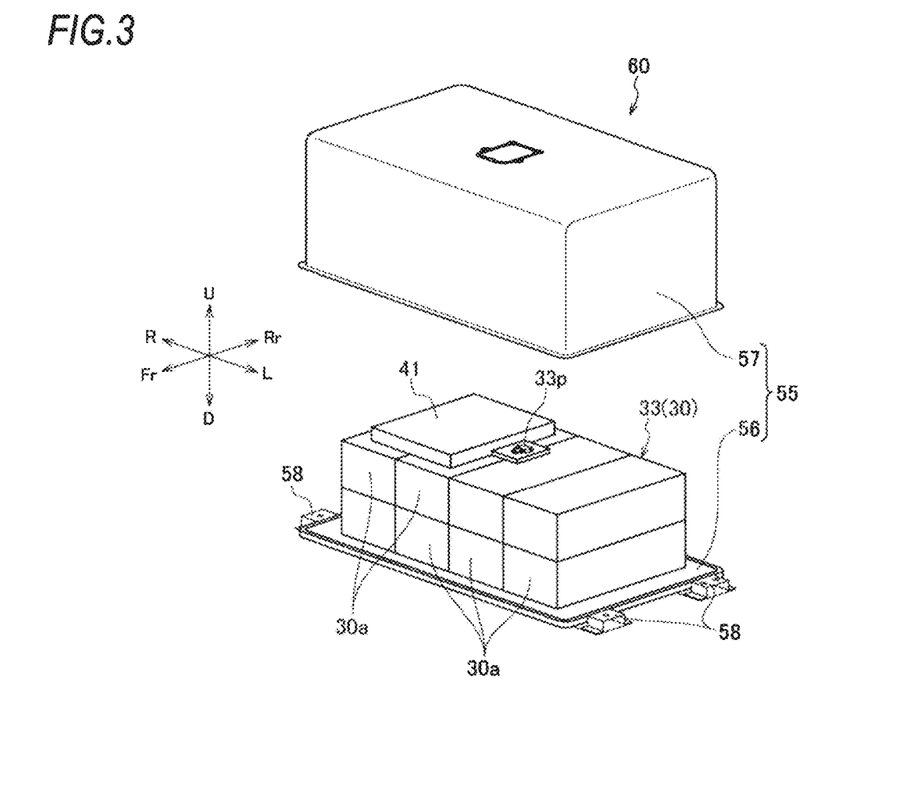
FIG. 3 is an exploded perspective view schematically illustrating a second battery unit mounted on the vehicle in FIG. 1.

Specifically, as illustrated in FIG. 2, the front module group 31 includes a total of six battery modules 30a arranged in a 3×2 matrix. That is, two battery modules 30a are arranged in the left and right direction (i.e. widthwise direction of the vehicle) in the state in which the longitudinal direction of the two battery modules 30a are aligned with the left and right direction, and three battery modules 30a are arranged in the front and rear direction of the vehicle. As illustrated in FIG. 2, the middle module group 32 includes a total of eight battery modules 30a. Six of the eight battery modules 30a are arranged in a 3×2 matrix such that two battery modules 30 are arranged in the left and right direction (i.e. widthwise direction of the vehicle) in the state in which the longitudinal direction of the two battery modules 30a are aligned with the left and right direction and three battery modules 30a are arranged in the front and rear direction of the vehicle. The remaining two battery modules 30a are stacked on the battery modules 30a arranged in the left and right direction and on the front row. As illustrated in FIG. 3, the rear module group 33 includes a total of eight battery modules 30a arranged such that four of the eight battery modules 30a are arranged in the left and right direction in the state in which the longitudinal direction of the four battery modules 30a is aligned with the front and rear direction of the vehicle and the remaining four battery modules 30a are stacked on the former four battery modules 30a.

[High Voltage System Equipment]

The high voltage system equipment 20 includes a DC-DC converter 22 and a junction box 23. The DC-DC converter 22 is a high voltage system equipment that transforms DC power. The junction box 23 is a unit provided with terminals used to join, branch, and relay electrical wirings and safety devices such as a fuse.

[First Battery Unit]

As illustrated in FIGS. 1 and 2, the front module group 31, the middle module group 32, the DC-DC converter 22, the junction box 23, and a casing 50 accommodating these components are unitized to form a first battery unit 10. The first battery unit 10 is arranged under a floor panel 3 providing the floor surface of a vehicle interior 2.

Figure 5:
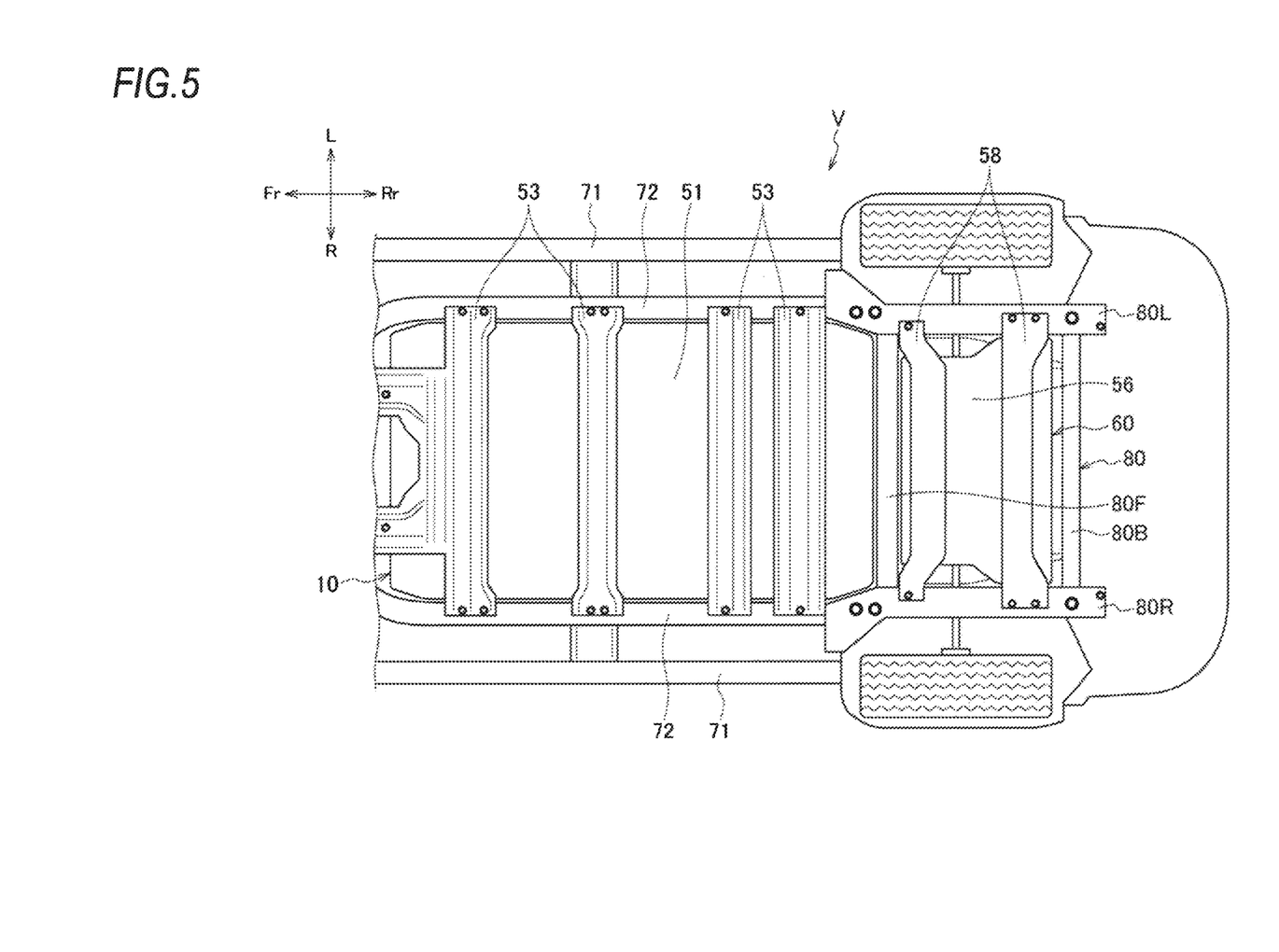
FIG. 5 is a partial bottom view of the vehicle as viewed from a rear side.
Figure 6A:
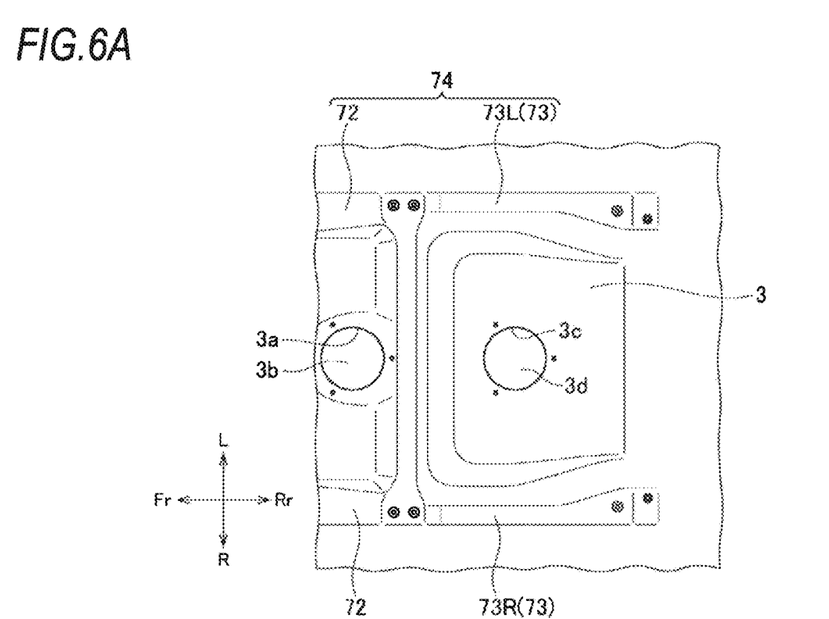
FIG. 6A is a bottom view of a floor panel.
Figure 6B:
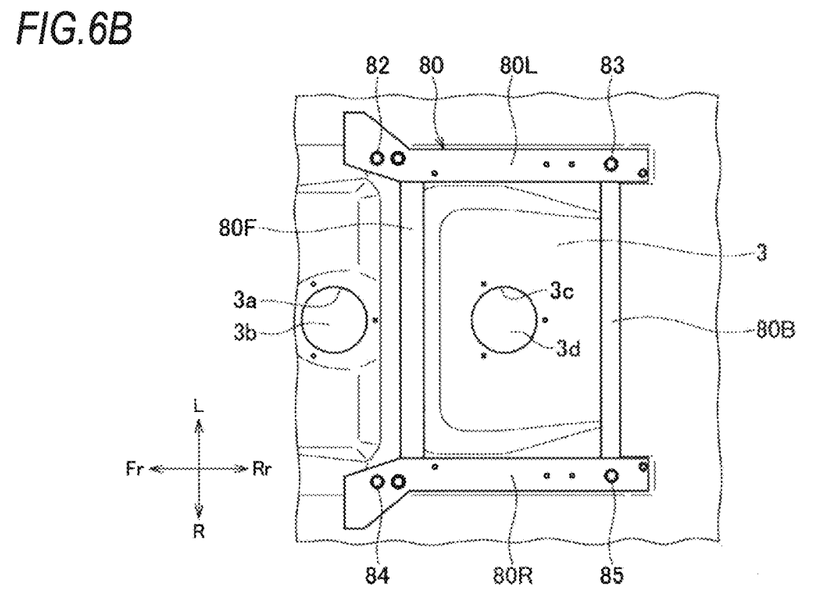
FIG. 6B is a bottom view of a floor panel to which a rear sub frame is attached.
Figure 6C:
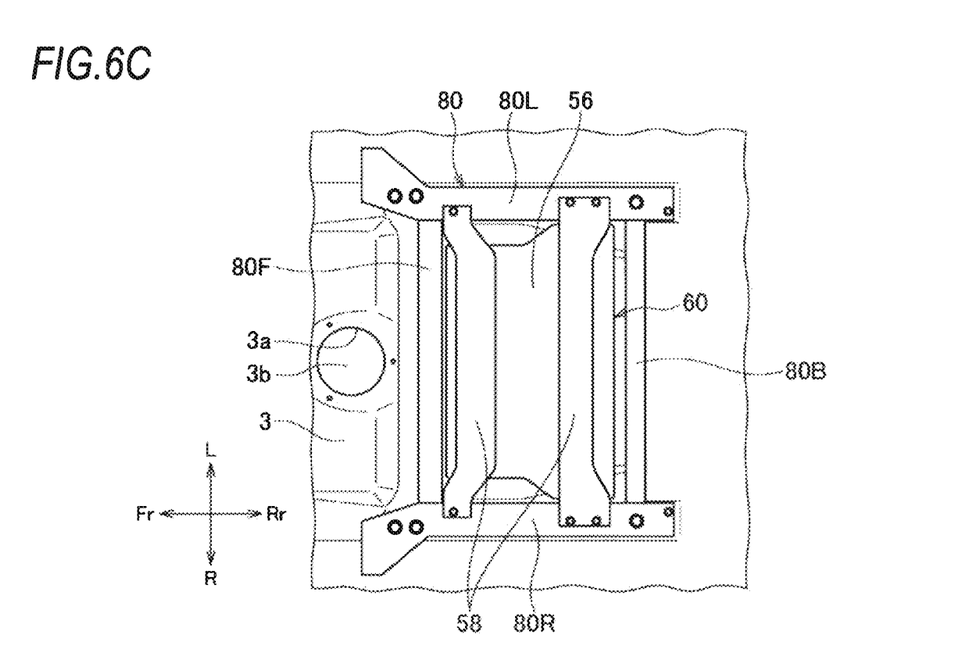
FIG. 6C is a bottom view of a floor panel on which a second battery unit is attached to a rear sub frame.

The casing 50 includes a bottom plate 51 on which the front module group 31, the middle module group 32, and the DC-DC converter 22 are mounted, and a cover 52 that covers these from above. As illustrated in FIG. 5, a plurality of brackets 53 is installed to extend across the bottom surface of the bottom plate 51 in the left and right direction. The brackets 53 are fastened from below to a pair of floor frames 72 juxtaposed with and installed inside side sills 71 arranged on respective sides of the vehicle V, whereby the first battery unit 10 is attached below the floor panel 3.

Since the casing 50 of the first battery unit 10 is fastened to the floor frames 72 in this manner, the front module group 31 is arranged under the front seats 4, and the middle module group 32 is installed under the rear seats 5. In the middle module group 32, the battery modules 30a arranged in the front row and stacked to form a double layer are located in the front portion of the rear seats. The DC-DC converter 22 and the junction box 23 are arranged between the front module group 31 and the middle module group 32 and at a middle portion of the first battery unit 10 in the widthwise direction of the vehicle. A high voltage cable (not illustrated) that connects the front module group 31 and the middle module group 32 to the junction box 23 is arranged at a midway position of the casing 50 of the first battery unit 10 in the widthwise direction of the vehicle. Two battery ECUs 40 are arranged respectively on left and right battery modules 30a disposed in the second and third rows of the middle module group 32 when counted from the front side. The battery ECUs 40 are battery controllers for managing the charge and discharge and the temperature of the front module group 31 and the middle module group 32.

Figure 8A:
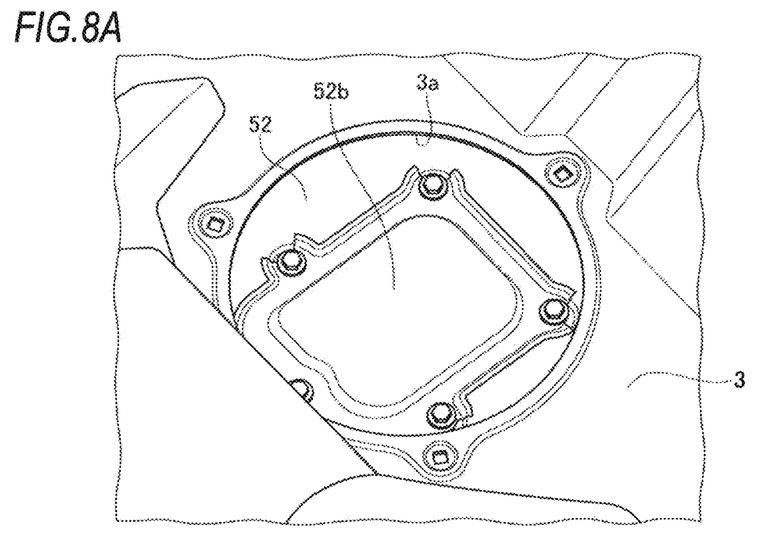
FIG. 8A is a perspective view of a first panel opening.
Figure 9A:
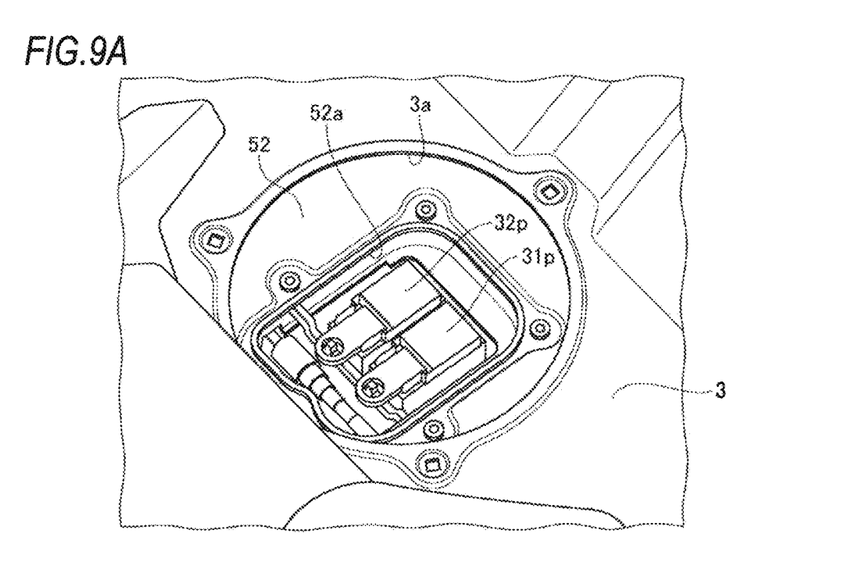
FIG. 9A is a perspective view of a first maintenance checking plug and a second maintenance checking plug exposed from the first panel opening.

A first maintenance checking plug 31p for interrupting the input and output of electricity of the front module group 31 and a second maintenance checking plug 32p for interrupting the input and output of electricity of the middle module group 32 are provided between the left and right battery ECUs 40 and arranged to be adjacent to each other on the left and right. As illustrated in FIGS. 8A and 9A, the cover 52 is provided with a first cover opening 52a through which the first maintenance checking plug 31p and the second maintenance checking plug 32p can be operated from the outside. The first cover opening 52a is normally closed by a maintenance lid 52b except during maintenance.

Also referring to FIG. 7, the floor panel 3 is provided with a first panel opening 3a at a position corresponding to the first cover opening 52a (maintenance lid 52b) of the cover 52, i.e., below the rear seats 5. The first panel opening 3a is also normally closed by a maintenance lid 3b except during maintenance. At the time of maintenance, by removing the rear seat 5 and opening the two maintenance lids 3b and 52b, an operation for interrupting the input and the output of electricity of the front module group 31 and the middle module group 32 can be performed in the vehicle interior 2.

[Second Battery Unit]

As illustrated in FIG. 3, the rear module group 33 and a casing 55 accommodating the rear module group 33 are unitized to form a second battery unit 60, and the second battery unit 60 is arranged under the floor panel 3 providing the floor surface of a luggage compartment 6.

Figure 4:
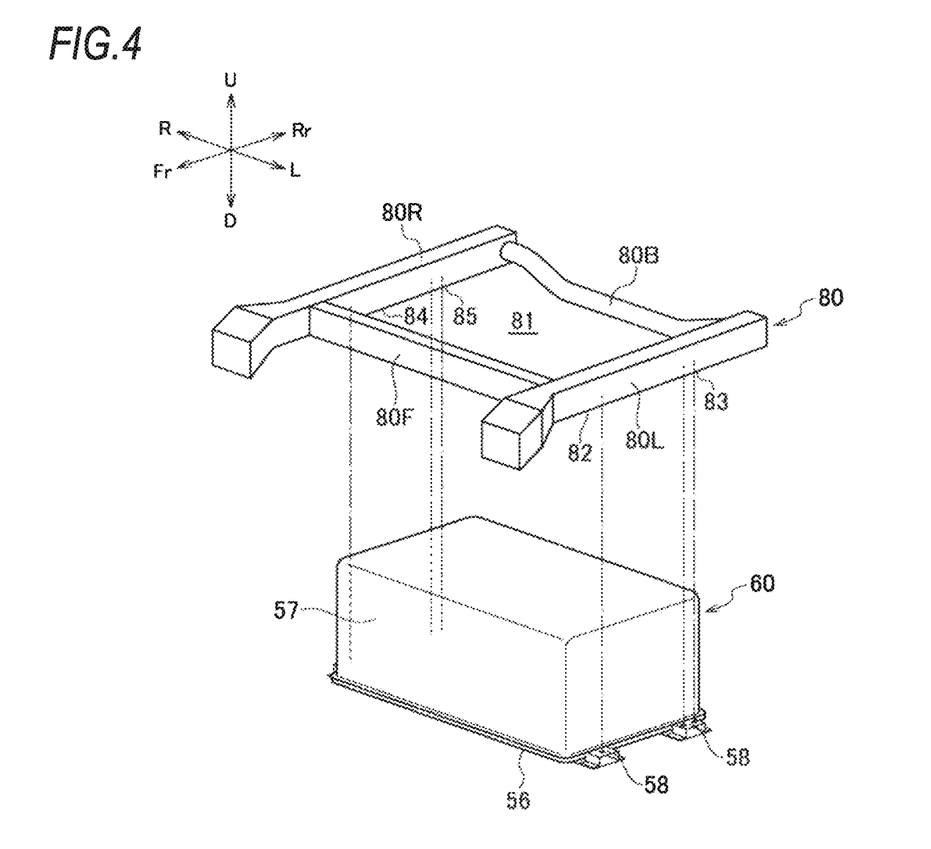
FIG. 4 is an exploded perspective view for describing an assembly of a rear sub frame and the second battery unit.

The casing 55 includes a bottom plate 56 on which the rear module group 33 is mounted and a cover 57 covering the rear module group 33 from above. As illustrated in FIG. 4, a plurality of brackets 58 is installed to extend across the bottom surface of the bottom plate 56 in the left and right direction. The brackets 58 are fastened to a rear sub frame 80 formed to surround the second battery unit 60. As illustrated in FIGS. 5 and 6A to 6C, the rear sub frame 80 is fastened to a pair of rear side members 73 extending rearward from the floor frames 72, whereby the second battery unit 60 is attached below the floor panel 3. Hereinafter, as to the rear side members 73, the rear side member 73 on the left side may be referred to as a left rear side member 73L and the rear side member 73 on the right side may be referred to as a right rear side member 73R.

As illustrated in FIG. 4, the rear sub frame 80 includes a pair of side frames respectively referred to as a left side frame 80L and a right side frame 80R and extending in the front and rear direction of the vehicle. The rear sub frame 80 further includes a pair of transverse frames respectively referred to as a front frame 80F and a rear frame 80B and connecting the left side frame 80L and the right side frame 80R to each other. The second battery unit 60 is disposed in a rectangular space 81 formed by the left side frame 80L, the right side frame 80R, the front frame 80F, and the rear frame 80B. A plurality of brackets 58 provided under the bottom plate 56 and installed to extend across the bottom plate 56 in the left and right direction is fastened to the bottom surfaces of the left side frame 80L and the right side frame 80R from below.

A left front fastening portion 82 fastened to the left rear side member 73L is provided at a front end portion of the left side frame 80L and a left rear fastening portion 83 fastened to the left rear side member 73L is provided at a rear end portion of the left side frame 80L. A right front fastening portion 84 fastened to the right rear side member 73R is provided at a front end portion of the right side frame 80R and a right rear fastening portion 85 fastened to the right rear side member 73R is provided at a rear end portion of the right side frame 80R.

As described above, the casing 55 of the second battery unit 60 is fixed to the rear side members 73 via the rear sub frame 80, and thus the rear module group 33 is disposed below the luggage compartment 6. As illustrated in FIG. 3, a battery ECU 41 is arranged on the battery modules 30a of the rear module group 33. The battery ECU 41 is a controller for managing the charge and discharge and the temperature of the rear module group 33.

Figure 8B:
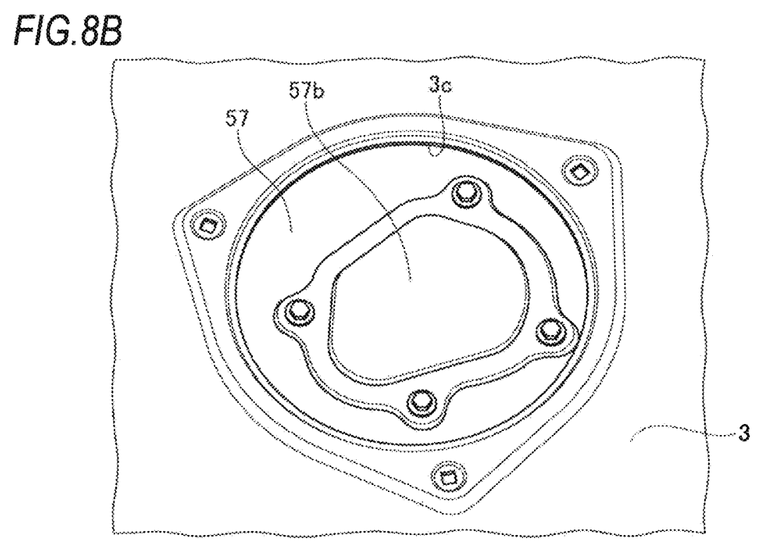
FIG. 8B is a perspective view of a second panel opening.
Figure 9B:
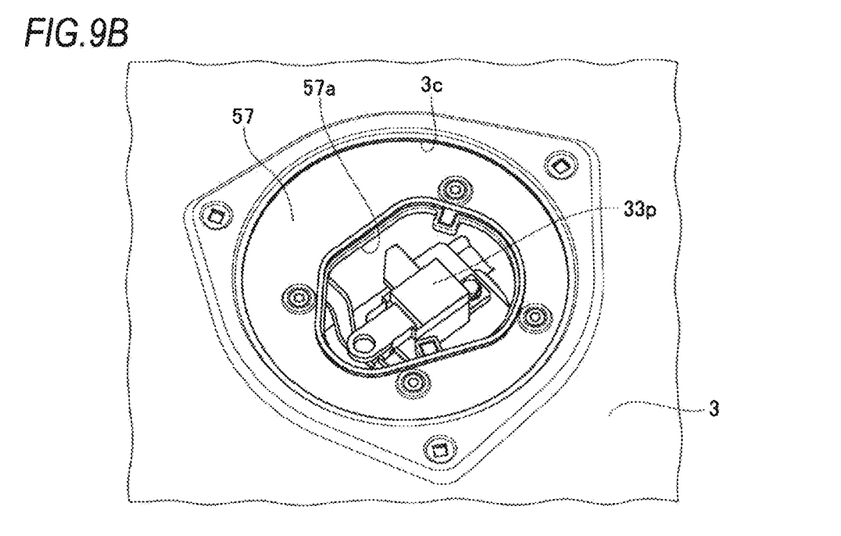
FIG. 9B is a perspective view of a third maintenance checking plug exposed from the second panel opening.

A third maintenance checking plug 33p for interrupting the input and output of electricity of the rear module group 33 is disposed next to the battery ECU 41. As illustrated in FIGS. 8B and 9B, the cover 57 is provided with a second cover opening 57a through which the third maintenance checking plug 33p can be operated from the outside. The second cover opening 57a is normally closed by a maintenance lid 57b except during maintenance.

Figure 7:
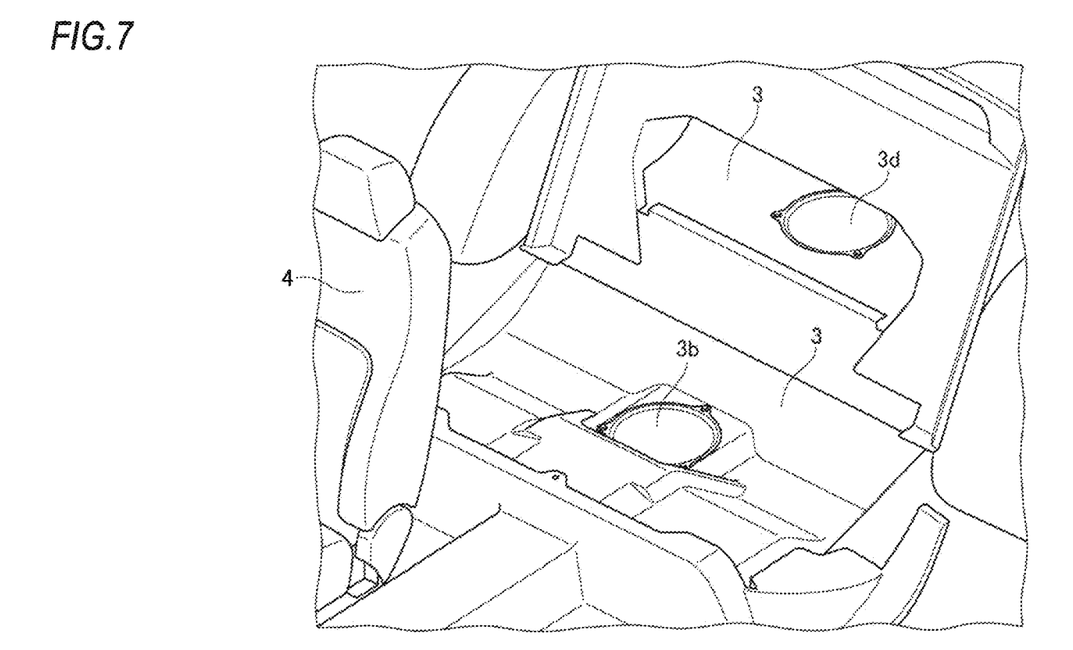
FIG. 7 is a perspective view of a floor panel as viewed from a vehicle interior.

Further, as illustrated in FIG. 7, the floor panel 3 is provided with a second panel opening 3c at a position corresponding to the second cover opening 57a (maintenance lid 57b) of the cover 57, that is, below the luggage compartment 6. The second panel opening 3c is also normally closed by a maintenance lid 3d except during maintenance. Therefore, at the time of maintenance, the two maintenance lids 3d and 57b are opened by turning over the floor mat of the vehicle interior 2. Thus, an operation for interrupting the input and output of electricity of the rear module group 33 can be performed in the luggage compartment 6 during the maintenance.

[Layout]

A space S is formed between the casing 50 of the first battery unit 10 fixed to the floor frames 72 and the casing 55 of the second battery unit 60 fixed to the rear side members 73 (see FIG. 1). The casing 50 and the casing 55 are independently and respectively fixed to the floor frames 72 and the rear side members 73. The floor frames 72 and the rear side members 73 constitute the skeletal structure 74 of the vehicle V.

The front frame 80F of the rear sub frame 80 surrounding the second battery unit 60 is disposed in the space S. A cross member that connects the left rear side member 73L and the right rear side member 73R to each other is arranged above the front frame 80F. The front frame 80F of the rear sub frame 80 is disposed to overlap the casing 50 of the first battery unit 10 and the casing 55 of the second battery unit 60 when viewed in the vertical direction. In addition, a harness 36 connecting the rear module group 33 of the second battery unit 60 and the junction box 23 arranged in the first battery unit 10 with each other is disposed below the front frame 80F. The harness 36 is also disposed in the casing 50 of the first battery 10, specifically at a middle portion in the widthwise direction of the casing 50, like the high voltage wiring (not illustrated) connecting the front module group 31 and the middle module group 32 with the junction box 23.

SUMMARY

As described above, according to the present embodiment, the casing 50 of the first battery unit 10, which accommodates the front module group 31 and the middle module group 32, and the casing 55 of the second battery unit 60, which accommodates the rear module group 33, are independently fixed to the skeletal structure 74. More specifically, the casing 50 of the first battery unit 10 is fixed to the floor frames 72 and the casing 55 of the second battery unit 60 is fixed to the rear side members 73. In addition, since the space S is formed between the casing 50 of the first battery unit 10 and the casing 55 of the second battery unit 60, it is possible to prevent the impact applied to the second battery unit 60 at the time of a rear collision from being directly transmitted to the first battery unit 10, thereby alleviating the impact.

In addition, the lower part of the front seat 4 and the rear seat 5 where the first battery unit 10 is disposed is a region which is relatively unlikely to receive an impact. Furthermore, deterioration in impact resistance also can be suppressed even when the front module group 31 and the middle module group 32 are unitized. Moreover, since the first battery unit 10 and the second battery unit 60 are arranged in the front and rear direction of the vehicle V, the weight balance is improved.

Since the first battery unit 10 and the second battery unit 60 are disposed below the floor panel 3 and both the casings 50 and 55 are fixed from below the vehicle V, the first battery unit 10 and the second battery unit 60 can be attached to and detached from the vehicle from below the vehicle V. Since the harness 36 connecting the rear module group 33 of the second battery unit 60 with the junction box 23 disposed in the first battery unit 10 is arranged below the front frame 80F, connection work for the harness 36 also can be performed from below the vehicle V, and thus assembly property and maintainability are improved.

In addition, since the junction box 23 and the high voltage wiring for connecting the front module group 31 and the middle module group 32 with the junction box 23 are arranged in a middle portion in the widthwise direction of the casing 50 of the first battery unit 10, the junction box 23 and the high voltage wiring can be protected from the impact at the time of a side collision.

In addition, since the second battery unit 60 is surrounded by the rear sub frame 80, the second battery unit 60 can be protected from the impact at the time of a rear collision. Since the rear module group 33 is located under the luggage compartment 6, the second battery unit 60 is likely to be easily impacted at the time of a rear collision. However, according to the present embodiment, the rear sub frame 80 surrounding the second battery unit 60 can protect the second battery unit 60, and the space S also can protect the first battery unit 10 from the impact received by the second battery unit 60 at the time of a rear collision.

Furthermore, since the front frame 80F of the rear sub frame 80 is arranged in the space S, and the cross member 88 is arranged above the front frame 80F, the first battery unit 10 can be protected, from the impact at the time of the rear collision, by the front frame 80F of the rear sub frame 80 and the cross member 88.

In addition, since the first maintenance checking plug 31p for interrupting the input and output of electricity of the front module group 31 and the second maintenance checking plug 32p for interrupting the input and output of electricity of the middle module group 32 are arranged close to each other, both of the maintenance checking plugs 31p and 32p can be accessed through a single first cover opening 52a provided in the casing 50.

In addition, since the first maintenance checking plug 31p and the second maintenance checking plug 32p can be operated through the first panel opening 3a formed in the floor pane 13, an operation for interrupting the input and output of electricity of the front module group 31 and the middle module group 32 can be performed in the vehicle interior at the time of maintenance. Since the third maintenance checking plug 33p also can be operated through the second panel opening 3c formed in the floor panel 3, an operation for interrupting the input and output of electricity of the rear module group 33 can be performed in the luggage compartment 6 at the time of maintenance.

[Modification]

The present invention is not limited to the embodiment described above but rather can be suitably changed, altered, or modified.

Although the embodiment described above uses the front module group 31 of the battery 30, the middle module group 32 of the battery 30, and the rear module group 33 as a front driving power source, a middle driving power source, and a rear driving power source, respectively, the front driving power source, the middle driving power source, and the rear driving power source may be any driving power source that can supply fuel or electric power to a driving unit (for example, engine, motor). For example, gasoline contained in a fuel tank, liquefied natural gas contained in a gas container, hydrogen fuel contained in a hydrogen container, or the like may be used as the rear driving power source instead of the rear module group 33.

The invention claimed is:

1. A vehicle comprising:
a first battery unit comprising a front module group which has a plurality of battery modules and which is arranged under a front seat of the vehicle, a middle module group which has a plurality of battery modules and which is arranged under a rear seat of the vehicle, and a front casing accommodating the front module group and the middle module;
a second battery unit comprising a rear module group which has a plurality of battery modules and which is arranged in a rear portion of the vehicle, and a rear casing accommodating the rear module group; and
a rear sub frame arranged in a region surrounding the second battery unit, wherein
the front casing and the rear casing are independently fixed to a skeletal structure of the vehicle,
a space is provided between the front casing and the rear casing,
a front frame of the rear sub frame is arranged in the space, and
the front frame is overlapped with the front casing and the rear casing in a vertical direction.

2. The vehicle according to claim 1, wherein
the first battery unit and the second battery unit are arranged under a floor panel, and
the front casing and the rear casing are fixed to the skeletal structure from below the vehicle.

3. The vehicle according to claim 1, wherein
the second battery unit is fixed to the skeletal structure via the rear sub frame.

4. The vehicle according to claim 1, wherein
a cross member connected across the skeletal structure is arranged above the front frame.

5. The vehicle according to claim 4, wherein
a high voltage system equipment is arranged together with the front module group and the middle module group in the front casing of the first battery unit, and
a harness extending from the rear module group of the second battery to the high voltage system equipment of the first battery unit is arranged under the front frame.

6. The vehicle according to claim 5, wherein
the front module group and the middle module group are connected to the high voltage system equipment through a high voltage wiring, and
the high voltage system equipment and the high voltage wiring are arranged at a middle portion of the front casing in a widthwise direction of the vehicle.

7. The vehicle according to claim 1, wherein
a first maintenance checking plug that interrupts input and output of electricity of the front module group and a second maintenance checking plug that interrupts input and output of electricity of the middle module group are arranged to be adjacent to each other in the first battery unit,
the first casing is provided with a first opening, and
the first maintenance checking plug and the second maintenance checking plug are operable through the first opening.

8. The vehicle according to claim 7, wherein
the first battery unit and the second battery unit are arranged under a floor panel, and
the first maintenance checking plug and the second maintenance checking plug are operable through a first panel opening provided in the floor panel.

9. The vehicle according to claim 8, wherein a third maintenance checking plug that interrupts input and output of electricity of the rear module group is arranged in the second battery unit, the rear casing is provided with a second opening, and the third maintenance checking plug is operable through the second opening and through a second panel opening provided in the floor panel.

10. The vehicle according to claim 1, wherein the rear module group is arranged under a luggage compartment.

11. A vehicle comprising:

a driving unit which is arranged in a front portion of a vehicle and which drives wheels of the vehicle;

a front driving power source which arranged under a front seat of the vehicle and which supplies fuel or electric power to the driving unit;

a middle driving power source which is arranged under a rear seat of the vehicle and which supplies fuel or electric power to the driving unit;

a rear driving power source which is arranged in a rear portion of the vehicle and which supplies fuel or electric power to the driving unit; and a rear sub frame arranged in a region surrounding the rear driving power source, wherein the front driving power source and the middle driving power source are accommodated in a front casing, the rear driving power source is accommodated in a rear casing, the front casing and the rear casing are independently fixed to a skeletal structure of the vehicle, a space is provided between the front casing and the rear casing, a front frame of the rear sub frame is arranged in the space, and the front frame is overlapped with the front casing and the rear casing in a vertical direction.

12. The vehicle according to claim 8, wherein the rear sub frame surrounds the second battery unit on a front side, a back side, a left side, and a right side of the second battery unit.

* * * * *